United States Patent
Damon et al.

(10) Patent No.: US 7,499,398 B2
(45) Date of Patent: Mar. 3, 2009

(54) METHOD AND SYSTEM FOR OVERSUBSCRIBING BANDWIDTH IN A COMMUNICATIONS NETWORK

(75) Inventors: Philippe Damon, Raleigh, NC (US); Claude Basso, Raleigh, NC (US); Jean L. Calvignac, Cary, NC (US); Francis Arts, Arendonk (BE); Pierre L. Debuysscher, De Pinte (BE)

(73) Assignee: International Business Machines Corporation, Armonk, NY (US)

( * ) Notice: Subject to any disclaimer, the term of this patent is extended or adjusted under 35 U.S.C. 154(b) by 987 days.

(21) Appl. No.: 10/418,125

(22) Filed: Apr. 16, 2003

(65) Prior Publication Data

US 2004/0208125 A1 Oct. 21, 2004

(51) Int. Cl.
*G01R 31/08* (2006.01)
(52) U.S. Cl. ............... 370/232; 370/230.1; 370/231; 370/235; 370/468; 370/401
(58) Field of Classification Search ............ 370/230, 370/230.1, 232, 233, 234, 235, 252, 253, 370/401, 468
See application file for complete search history.

(56) References Cited

U.S. PATENT DOCUMENTS

| | | | |
|---|---|---|---|
| 5,311,513 A | 5/1994 | Ahmadi et al. | |
| 5,347,635 A | 9/1994 | Voeten et al. | |
| 5,381,407 A | 1/1995 | Chao | |
| 5,412,647 A | 5/1995 | Giroux et al. | |
| 5,432,713 A | 7/1995 | Takeo et al. | |
| 5,511,066 A | 4/1996 | Witters et al. | |
| 5,541,913 A | 7/1996 | Witters et al. | |
| 5,790,521 A | 8/1998 | Lee et al. | |

(Continued)

FOREIGN PATENT DOCUMENTS

JP 11150565 6/1999

OTHER PUBLICATIONS

Alves, Igor B.H. de A. et al., "Evaluating Fairness in Aggregrated Traffic Marking," IEEE, Nov. 27-Dec. 1, 2000, vol. 1, pp. 445-449.

(Continued)

*Primary Examiner*—Ricky Ngo
*Assistant Examiner*—Kibrom T Hailu
(74) *Attorney, Agent, or Firm*—Sawyer Law Group LLP

(57) ABSTRACT

A method for oversubscribing bandwidth in a communication network, is disclosed. The method includes policing a first data flow and outputting a first output data flow from the first meter, in relation to a first Committed Information Rate (CIR) and a first Peak Information Rate (PIR); policing a second data flow and outputting a second output data flow from the second meter in relation to a second CIR and a second PIR; and policing an aggregated output data flow of the first output data flow and the second output data through a third meter of the oversubscription module, where the aggregated output data flow is policed in relation to a third CIR and a third PIR.

9 Claims, 4 Drawing Sheets

U.S. PATENT DOCUMENTS

| | | | |
|---|---|---|---|
| 5,818,815 | A | 10/1998 | Carpentier et al. |
| 5,828,654 | A | 10/1998 | Takase et al. |
| 5,953,317 | A | 9/1999 | Ogasawara et al. |
| 5,999,518 | A | 12/1999 | Nattkemper et al. |
| 6,028,843 | A | 2/2000 | Delp et al. |
| 6,032,272 | A | 2/2000 | Soirinsuo et al. |
| 6,175,568 | B1 | 1/2001 | Awdeh |
| 6,198,743 | B1 | 3/2001 | Giroux et al. |
| 6,826,147 | B1 * | 11/2004 | Nandy et al. ............ 370/229 |
| 7,161,904 | B2 * | 1/2007 | Hussain et al. ........... 370/230 |
| 2002/0087715 | A1 * | 7/2002 | De Cnodder et al. ...... 709/235 |
| 2003/0174649 | A1 * | 9/2003 | Shankar et al. ........... 370/235 |

OTHER PUBLICATIONS

Cao, Zhiruo et al., "Rainbow Fair Queueing: Fair Bandwidth Sharing Without Per-Flow State," IEEE, Mar. 26-30, 2000, vol. 2, pp. 922-931.

Hurley, Paul et al., "ABE: Providing a Low-Delay Service within Best Effort," IEEE, May-Jun. 2001, vol. 15, Issue 3, pp. 60-69.

Wang, Fugui et al., "A Random Early Demotion and Promotion Marker for Assured Services," IEEE, Dec. 2000, vol. 18, Issue 12, pp. 2640-2650.

"Method for Efficiently Providing Different Levels of Network Availability in High-Speed Networks," IBM Technical Disclosure Bulletin, vol. 3, No. 01, Jan. 1994, pp. 509-513.

* cited by examiner

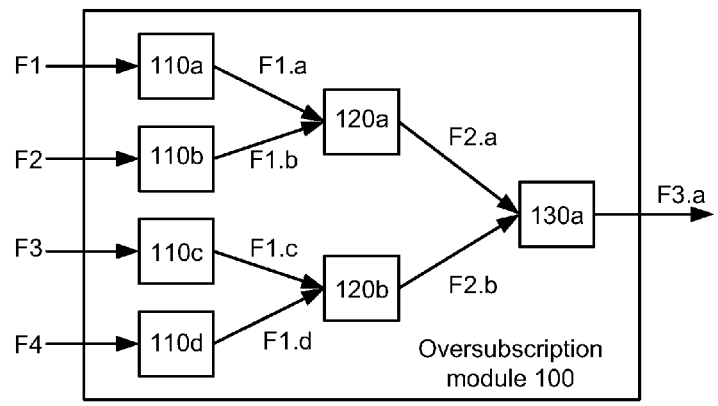
FIG. 3
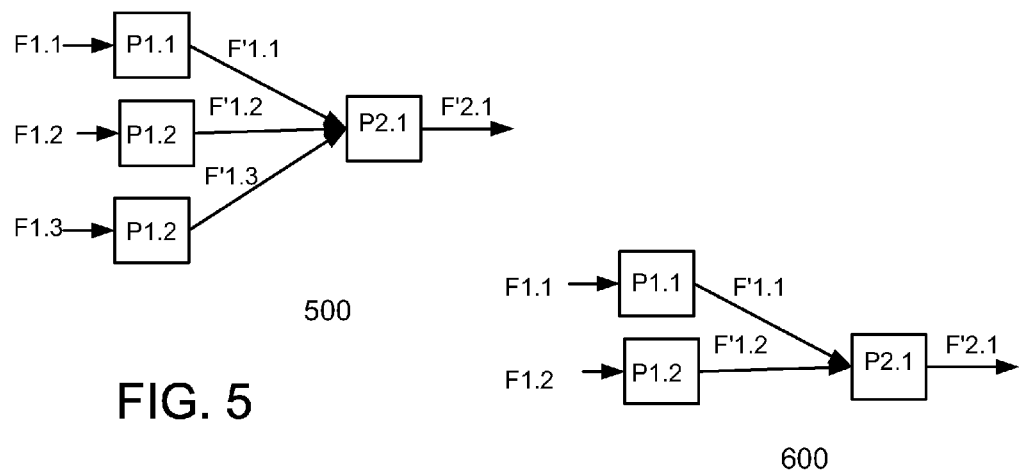
FIG. 5
FIG. 6

METHOD AND SYSTEM FOR OVERSUBSCRIBING BANDWIDTH IN A COMMUNICATIONS NETWORK

FIELD OF THE INVENTION

The present invention relates to resource management in a communication network and more particularly to a method for oversubscribing bandwidth in a communication network.

BACKGROUND OF THE INVENTION

Advances in communication technology have transformed the Internet in a true information super highway. Scores of communication networks, shared and private, interconnect with one another to provide traffic paths between users. A shared network provides communication services to all users, such as corporations and individuals, willing to subscribe, and is maintained by a service provider. As the number of users increases, the service provider must invest in new equipment to meet the needs of its customers. This is particularly true if the service provider offers guaranteed levels of service for customers who demand certain levels of bandwidth.

Because capital expenditures are costly and therefore, generally avoided, service providers strive to maximize utilization of their existing resources, while minimizing traffic congestion. One way of achieving this goal is for the service provider to oversubscribe its service to its customers, i.e., reserving fewer resources than the sum of what each user is requesting. The underlying assumption for oversubscription is that the probability of all (or a large proportion of) users requesting service at the same time is statistically low. Therefore, the service provider should be able to expand its user base, while maintaining an acceptable level of service without necessarily expanding its network resources.

In a connection-oriented network, e.g., an Asynchronous Transfer Mode (ATM) network, each user of the network must create a connection to transmit and receive traffic. When the connection is created, some network resources, such as bandwidth, processing power and memory, are allocated and reserved for this connection. This constitutes an agreement between the user and the network's service provider. The service provider must enforce this agreement during the lifetime of the connection. Oversubscription in such an environment is common and relatively straightforward because network resources are reserved prior to the transmission of data.

In a connection-less network, e.g., an IP network such as the Internet, a service provider should also have the ability to reserve network resources for its users, except that a pre-established connection is not utilized. Instead, each packet transmitted from and received by a given user is identified, e.g., encoded, such that the service provider can determine from the packet its priority level and reserve the necessary network resources to enforce the agreement. Oversubscription in a connection-less network environment is complicated because network resources are reserved when traffic flow arrives at the network, and not prior to transmission. If the network is operating at, or near, capacity, the service provider can have difficulties providing promised levels of service for its customers, thereby impacting the quality of service.

For example, if a user wishes to send and receive realtime voice and video data, i.e., Constant Bit Rate (CBR) traffic, the service provider can agree to guarantee a certain level of bandwidth for the user's traffic. The agreed level of guaranteed bandwidth is referred to as a Committed Information Rate (CIR), and data flow within this range would be considered high priority. If the network is oversubscribed, the service provider cannot guarantee that high priority flow will be transmitted in the place of low priority flow, such as Unspecified Bit Rate (UBR) or Best Effort (BE) traffic. Thus, oversubscription can cause serious erosion in a provider's quality of service.

Most oversubscription methods for both connection-oriented and connection-less networks are based on static models that are network specific, or complex statistical models that are generally difficult to implement. In addition, most oversubscription methods cover only a single level of oversubscription.

Accordingly, a need exists for an improved method for oversubscribing bandwidth in connection-oriented and connection-less communication networks. The method should ensure that high priority flow is given precedence over low priority flow. The method should be efficient, highly adaptable and easy to implement in a variety of networks. The method should also provide multilevel oversubscription. The present invention addresses such a need.

SUMMARY OF THE INVENTION

The present invention is directed to a method for oversubscribing bandwidth in a communication network. The method is for using an oversubscription module to provide multilevel oversubscription of bandwidth of a network to a plurality of users, including at least a first user and a second user, each capable of transmitting data flow to the network. The method further includes policing a first data flow from the first user through a first meter of the oversubscription module and outputting a first output data flow from the first meter, where the first data flow is policed in relation to a first Committed Information Rate (CIR) and a first Peak Information Rate (PIR), wherein the first Committed Information Rate (CIR) is a guaranteed level of bandwidth allocated to the first data flow determined in relation to a first service agreement, and the first Peak Information Rate (PIR) is a maximum bandwidth allocated to the first data flow determined in relation to the first service agreement. The method also includes policing a second data flow from the second user through a second meter of the oversubscription module and outputting a second output data flow from the second meter, where the second data flow is policed in relation to a second Committed Information Rate (CIR) and a second Peak Information Rate (PIR), wherein the second Committed Information Rate (CIR) is a guaranteed level of bandwidth allocated to the second data flow determined in relation to a second service agreement, and the second Peak Information Rate (PIR) is a maximum bandwidth allocated to the second data flow determined in relation to a second service agreement. The method further includes policing an aggregated output data flow of the first output data flow from the first meter and the second output data flow from the second meter through a third meter of the oversubscription module, where the aggregated output data flow is policed in relation to a third Committed Information Rate (CIR) and a third Peak Information Rate (PIR), wherein the third Committed Information Rate (CIR) is greater than or equal to a summation of the first Committed Information Rate (CIR) and the second Committed Information Rate (CIR), and the third Peak Information Rate (PIR) is at least equal to a larger of the first Peak Information Rate (PIR) or the second Peak Information Rate (PIR) to ensure high priority transfer of data from the first user and the second user through the network.

In a preferred embodiment of the present invention, each oversubscription meter reserves bandwidth to forward all high priority packets in the output flow from the meter and oversubscribes bandwidth for low priority packets. Accordingly, network resources can be oversubscribed at multiple levels, while ensuring that all high priority packets are transmitted through the network.

BRIEF DESCRIPTION OF THE DRAWINGS

FIG. 3 is a block diagram of the oversubscription module 100 according to a preferred embodiment of the present invention.

FIG. 5 is a block diagram of an oversubscription module 500 according to a preferred embodiment of the present invention that accompanies Example 1.

FIG. 6 is a block diagram of an oversubscription module 600 according to a preferred embodiment of the present invention that accompanies Example 2

DETAILED DESCRIPTION

The present invention relates to resource management in a communication network and more particularly to a method for oversubscribing bandwidth in a communication network. The following description is presented to enable one of ordinary skill in the art to make and use the invention and is provided in the context of a patent application and its requirements. Various modifications to the preferred embodiment(s) and the generic principles and features described herein will be readily apparent to those skilled in the art. For instance, while the discussion will be primarily focused on connection-less networks, such as an IP network, those skilled in the art will readily appreciate that the principles can be applied to connection-oriented networks as well. Thus, the present invention is not intended to be limited to the embodiment(s) shown but is to be accorded the widest scope consistent with the principles and features described herein.

Figure 1:
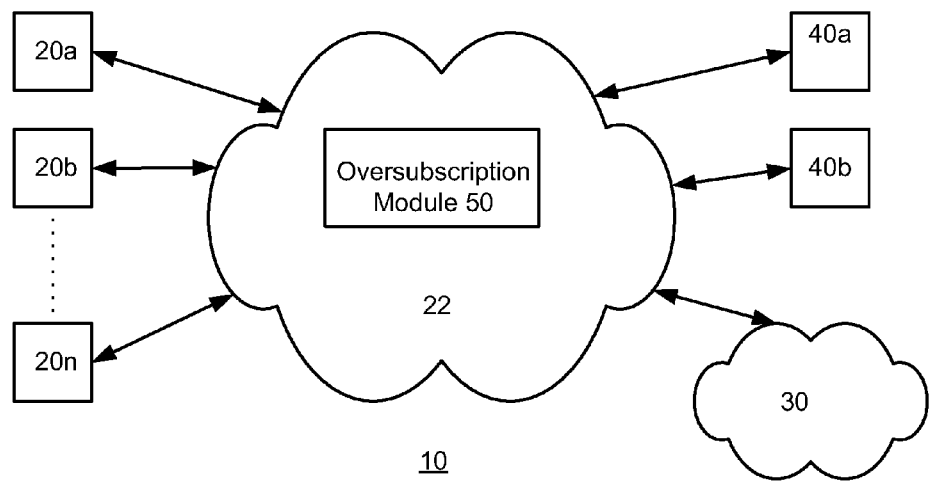
FIG. 1 is a block diagram of a connection-less information distribution network in which the present invention could be implemented in accordance with a preferred embodiment.

To describe the general environment of the present invention, please refer to FIG. 1, which is a block diagram of a connection-less information distribution network 10. As is shown, the distribution network 10 includes a plurality of users or sources $20a, 20b \ldots 20n$ that transmit data flow to a network 22. In the following discussion, the term "flow" is used to indicate a stream of data packets, e.g., IP packets. Thus, a group of packets transmitted by a source (e.g., $20a$) to a network 22 is collectively referred to as "flow," and is represented by the arrow between the source $20a$ and the network 22. The network 22 typically collects the flow from the sources $20a, 20b \ldots 20n$, and forwards the flow to their respective destinations $40a, 40b, \ldots 40n$, or aggregates flow and forwards the aggregated flow to a next network 30.

As stated above, the network 22 can allocate a certain level of bandwidth for data flow originating from a source $20a$. A service agreement between the source $20a$ and the network 22 sets forth the amount of bandwidth, if any, dedicated to data flow from that source $20a$. As stated earlier, this dedicated bandwidth is referred to as the "Committed Information Rate" (CIR), and is measured in bytes of IP packets per second. Data flow within the CIR is generally designated as "high priority." In some instances, the service agreement will indicate that no bandwidth will be reserved for a particular source $20b$, e.g., CIR=0. In this case, data flow from this particular source $20b$ is of the "best effort" type, i.e., the network 22 will make a best effort to forward the data flow.

In addition to reserving bandwidth for a source $20a$, the network can also typically designate an additional amount of bandwidth for "bursts" of data. This additional amount of bandwidth is referred to as a "Peak Information Rate" (PIR). The PIR is the maximum level of bandwidth that is provided by the network 22 for the source $20a$. Data flow exceeding the CIR but below the PIR is generally designated as "best effort" or "low priority." Data flow exceeding the PIR is typically discarded. Generally, the PIR is greater than zero and is greater than or equal to the CIR.

Thus, for each source $20a, 20b, \ldots 20n$, the network 22 provides a minimum amount of bandwidth (CIR), which may or may not be reserved, and a maximum amount of bandwidth (PIR) for incidental bursts of flow. In an oversubscription method of the present invention, the bandwidth corresponding to the PIR is oversubscribed via an oversubscription module 50.

Referring again to FIG. 1, the network 22 includes an oversubscription module 50 through which all the data flow from each source $20a, 20b, \ldots 20n$ passes. According to a preferred embodiment of the present invention, the oversubscription module 50 ensures that high priority data flow from each source $20a, 20b, \ldots 20n$ is forwarded through the network 22. The oversubscription module 50 discards data flow that violates the service agreement between a source $20a$ and the network 22. To the extent PIR bandwidth is available, the oversubscription module 50 will forward low priority data flow through the network 22. Low priority data flow exceeding available bandwidth is discarded. While the oversubscription module 50 is shown as a stand alone module in FIG. 1, those skilled in the art would appreciate that the oversubscription module 50 can be implemented in a separate server (not shown) or in a dedicated network processor (not shown).

Figure 2:
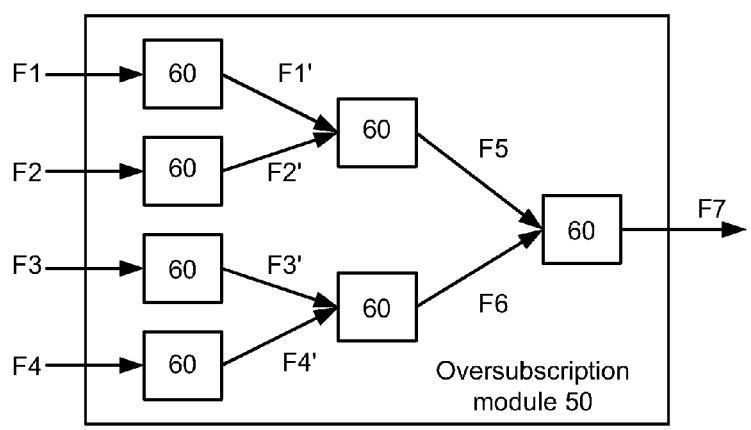
FIG. 2 is a block diagram of the oversubscription module 50 according to a preferred embodiment of the present invention.

FIG. 2 is a block diagram of the oversubscription module 50 according to a preferred embodiment of the present invention. As is shown, the oversubscription module 50 comprises a plurality of cascaded meters 60. Each meter receives flow (e.g., F1, F2, F1', F2'), polices the flow according to a flow agreement, and generates an output flow (e.g., F1', F2', F5, F6), which is cascaded to a next level of meters 60. In the oversubscription method of the present invention, each meter 60 transmits, at a minimum, any high priority flow it receives. To do this, each meter 60 differentiates between high and low priority flow and generates its output flow based on such priority.

In a preferred embodiment, the meters 60 are modeled according to the meter in a Two Rate Three Color Marker, as described in Request for Comments: 2698 (Heinanen & Guerin September 1999) ("RFC 2698") and incorporated herein by reference. The Two Rate Three Color Marker is a policing circuit that enforces a service agreement between a source $20a$ and the network 22. The policing circuit includes a meter that meters each packet in the flow as it enters the network 22, and a marker that marks the packets either green, yellow, or red. The meter calculates what the color of the packet should be by running a policing algorithm, which is based on the incoming flow and the service agreement. The calculated color can also be dependent on the input color of the packet. Meters that consider the input color of the packet are referred to as "color-aware," while those that do not are referred to as "color-blind."

The policing algorithm applied by the meter generally incorporates the service agreement, which at a minimum, establishes the agreed CIR and PIR for the flow. In general, a packet will be red if the flow exceeds the PIR, yellow if the flow exceeds the CIR but is less than the PIR, and green if the flow is less than or equal to the CIR. Green packets are high priority traffic, e.g., CBR traffic, and yellow packets are low priority traffic, e.g., best effort. Red packets are discarded.

Figure 4A:
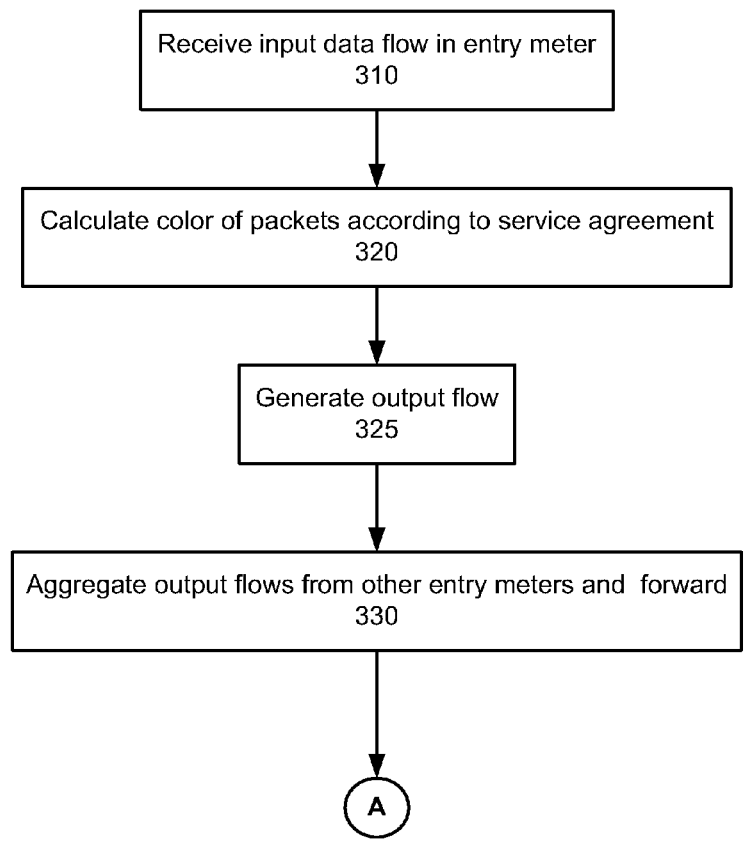
FIGS. 4A and 4B are flowcharts illustrating a process for overscribing the network according to a preferred embodiment of the present invention.
Figure 4B:
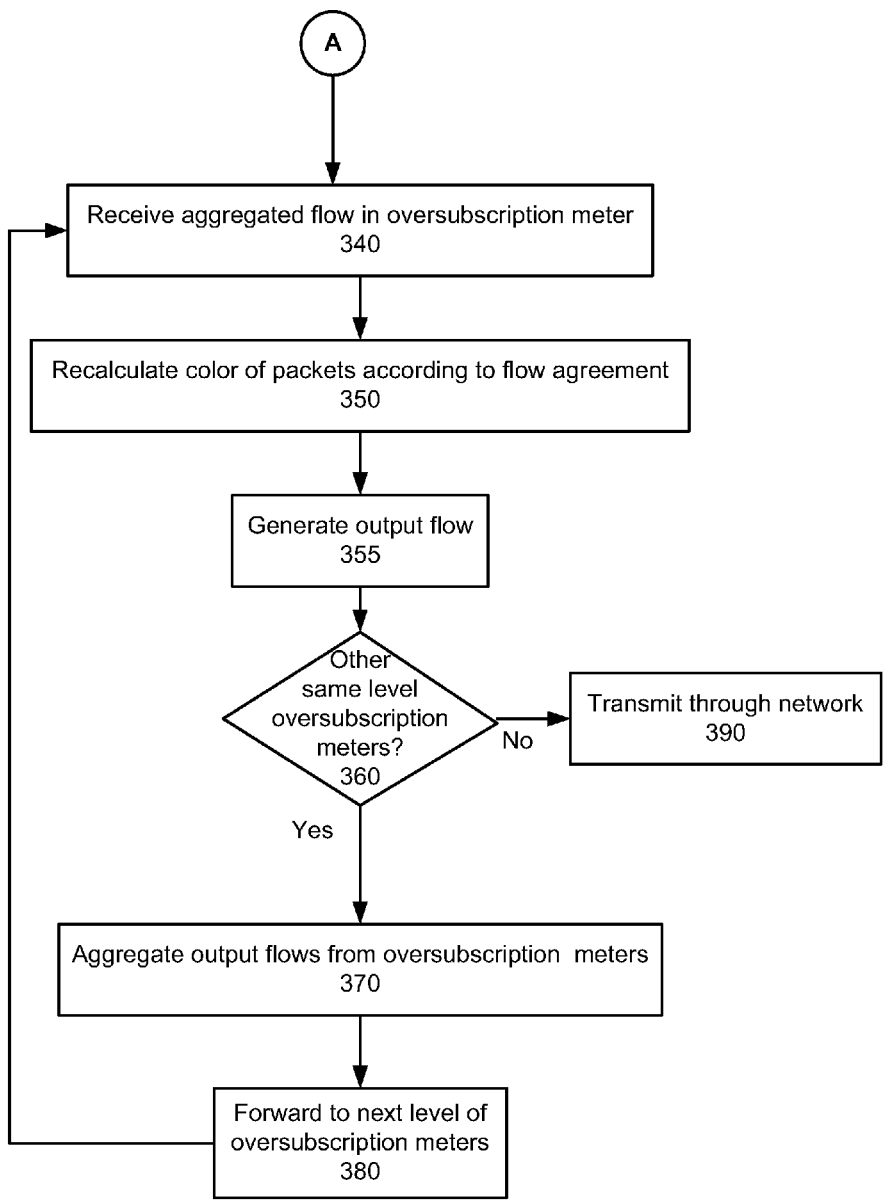

To describe better the method of the present invention, please refer now to FIG. 3 and FIGS. 4A and 4B. FIG. 3 is a block diagram of the oversubscription module 100 according to a preferred embodiment of the present invention, and FIGS. 4A and 4B are flowcharts illustrating a process for oversubscribing the network according to a preferred embodiment of the present invention. As is shown in FIG. 3, the oversubscription module 100 comprises a plurality of entry meters, e.g. 110a, 110b, 110c, 110d, a first level of oversubscription meters 120a, 120b, and a second level oversubscription meter 130a.

The process begins in step 310, whereby each entry meter 110a-110d receives data flow (F1, F2, F3, F4) from different sources (not shown) (FIG. 4A). The entry meters can be either color-aware or color-blind. Each entry meter (e.g., 110a) calculates the color of each packet in the flow based on a service agreement between the source of the flow (F1) and the network 22 in step 320. Thus, the configuration of the entry meter (110a) reflects directly the service agreement. The calculated color is related to the packet's priority relative to the meter 110a, and the color is referred to as the packet's cascaded color. It is important to note that the calculated color is associated with each packet and that the packet is not marked. In other words, unlike the policing circuit described in RFC 2698, each packet is not recolored with the cascaded color.

In step 325, the entry meter 110a generates an output flow (F1.a). Depending on the service agreement and the input flow F1, the output flow (F1.a) can include green packets (high priority), yellow packets (low priority), or both. Red packets are discarded, and therefore, not included in the output flow (F1.a). In step 330, the output flow (F1.a) is aggregated with output flows from other entry meters (e.g., F1.b) and forwarded to one of a plurality of first level oversubscription meters (120a, 120b). For example, in FIG. 3, output flows F1.a and F1.b from entry meters 110a and 110b, respectively, are aggregated and forwarded to first level oversubscription meter 120a, while the remaining outputted flows F1.c and F1.d are aggregated and forwarded to first level oversubscription meter 120b. Those skilled in the art would readily recognize that various flow patterns are possible, and that the present invention is not limited to the flow pattern illustrated in FIG. 3.

In a preferred embodiment, each of the oversubscription meters (120a, 120b, 130a) is color-aware. Accordingly, once the aggregated flow (e.g., F1.a+F1.b) is received by the first level oversubscription meter (e.g., 120a) in step 340 (FIG. 4B), it considers each packet's cascaded color as it recalculates the color of each packet in the flow (F1.a+F1.b) according to an oversubscription flow agreement in step 350. An output flow (F2.a) is generated in step 355.

In step 360, it is determined whether another first level oversubscription meter exists. If at least one other first level oversubscription meter exists, the output flow (F2.a) from the first level oversubscription meter 120a is aggregated with flow from the other first level oversubscription meters, e.g., F2.b, in step 370. In step 380, the aggregated flow (F2.a+F2.b) is forwarded to a next level oversubscription meter 130a, and steps 340-360 are repeated. If other same level oversubscription meters do not exist, the output flow (F3.a) is transmitted through the network in step 390. While FIG. 4 illustrates two levels of oversubscription, e.g., meters 120a, 120b and 130a, those skilled in the art would readily appreciate that any number of levels of oversubscription can be implemented depending on system needs.

In a preferred embodiment, the oversubscription flow agreements for the oversubscription meters 120a, 120b, 130a allow a service provider to oversubscribe the network 22, while ensuring the transmission of high priority flow from its customers. To accomplish the latter, each oversubscription flow agreement sets aside enough bandwidth to handle all packets having a cascaded green color. In particular, the CIR is at least that of the summation of CIRs of the previous meters. For example, the CIR for oversubscription meter 120a would be at least the summation of the CIRs for entry meters 110a and 110b. The oversubscription flow agreement also defines the degree of oversubscription in the network by controlling the PIR for the oversubscription meter 120a. Here, in order to oversubscribe PIR bandwidth, the PIR is less than the summation of PIRs for the previous meters. Preferably, the PIR is equal to at least the highest PIR of the previous meters.

Referring again to FIG. 2, it is important to note that each meter 60 associates a color with each packet and does not actually mark the packet. In other words, unlike the policing circuit described in RFC 2698, each packet is not recolored with the cascaded color. Thus, if a packet is part of the flow (F7) exiting the oversubscription module 50, it retains its original color regardless of its cascaded color. In this manner, the oversubscription module 50 oversubscribes the network 22 without affecting the packets that are transmitted over the network 22.

To understand better the operation of the present invention, please refer to the following examples and accompanying Figures.

EXAMPLE 1

FIG. 5 is a block diagram of an oversubscription module 500 according to a preferred embodiment of the present invention that accompanies Example 1. Assume input flows F1.1, F1.2 and F1.3 are of best effort type. In this case, no bandwidth is reserved for best effort flow. Accordingly, the service agreements for the entry meters (P1.1, P1.2 and P1.3) define CIR=0, PIR=30. A service provider wishes to aggregate the flows (F1.1, F1.2 and F1.3) such that the outgoing flow (F'2.1) is of type CBR. The oversubscription meter P2.1 will have an oversubscription flow agreement that defines CIR=PIR=30.

Given this configuration, consider the following flow:

F1.1=F1.2=F1.3=15 green best effort packets

Because CIR<15<PIR, each of the packets will have a cascaded color yellow. The output flow (F'1.1, F'1.2, F'1.3) from each entry meter (P1.1, P1.2, P1.3) will include 15 yellow packets. Therefore, the aggregated flow will include 45 yellow packets, which are passed to the oversubscription meter P2.1. Here, the oversubscription meter P2.1 will return 30 yellow packets and 15 red packets because PIR=30. The 15 red packets will be discarded and the outgoing flow (F'2.1) will include 30 green packets. Preferably, the outgoing flow (F'2.1) is evenly distributed between the three original flows (F1.1, F1.2, F1.3).

Now consider the following flow for the same configuration:

F1.1=F1.2=15 green best effort; F1.3=0

As before, output flow (F'1.1, F'1.2) from each entry meter (P1.1, P1.2) will include 15 yellow packets. Nevertheless the aggregated flow now comprises 30 yellow packets. The oversubscription meter P2.1 will pass all 30 packets. Thus, when resources are available (e.g., PIR bandwidth), the maximum number of packets will pass.

EXAMPLE 2

FIG. 6 is a block diagram of an oversubscription module 600 according to a preferred embodiment of the present invention that accompanies Example 2, where like components share like references. Assume input flow F1.1 is of type CBR and F1.2 is of best effort type. The service agreement for the entry meter P1.1 defines CIR=PIR=10, and the service agreement for entry meter P1.2 defines CIR=0, PIR=30. A service provider wishes to aggregate the flows (F1.1 and F1.2) such that the outgoing flow (F'2.1) is of type CBR. The oversubscription meter P2.1 will have an oversubscription flow agreement that defines CIR=10, PIR=30. Note that the CIR should be at least 10 to ensure quality of service for the CBR flow F1.1.

Given this configuration, consider the following flow:

F1.1=15 green CBR; F1.2=25 green best effort

Output flow (F'1.1) from entry meter P1.1 comprises 10 green packets (5 red packets discarded). Output flow (F'1.2) from entry meter P1.2 comprises 25 yellow packets. Outgoing flow (F'2.1) from the oversubscription meter P2.1 comprises 30 green packets—the 10 cascaded green packets and 20 cascaded yellow packets. Five additional red packets are discarded.

In this case, high priority flow (i.e., 10 green packets) is transmitted and unaffected by the oversubscription of PIR bandwidth. To the extent that PIR bandwidth is available, low priority flow (e.g., 20 yellow packets) will also be transmitted.

Now consider the following flow for the same configuration:

F1.1=0; F1.2=25 green best effort packets

The aggregated flow passed to the oversubscription meter P2.1 comprises 25 yellow packets. The outgoing flow (F'2.1) comprises 25 green best effort packets. In this case, no high priority flow is present, and therefore, non-utilized resources can be used to transmit low priority flow.

Through aspects of the method of the present invention, network resources can be oversubscribed at multiple levels, while ensuring that all high priority flow is transmitted through the network. By utilizing meters modeled after the meter in a Two Rate Three Color Marker, the oversubscription module is platform independent and compatible for connection-less, as well as connection oriented networks. The method of the present invention is easily implemented because the Two Rate Three Color Marker is a well known policing circuit and the policing algorithm is not modified.

Although the present invention has been described in accordance with the embodiments shown, one of ordinary skill in the art will readily recognize that there could be variations to the embodiments. For example, although the preferred embodiment utilizes a Two Rate Three Color Marker meter, any type of policing meter that has the capability to differentiate between high and low priority flow, e.g., a Single Rate Three Color Marker (RFC 2697), is suitable. Those variations would be within the spirit and scope of the present invention.

Accordingly, many modifications may be made by one of ordinary skill in the art without departing from the spirit and scope of the appended claims.

What is claimed is:

1. A method for using an oversubscription module to provide multilevel oversubscription of bandwidth of a network to a plurality of users, including at least a first user and a second user, each capable of transmitting data flow to the network, the method comprising:

policing a first data flow from the first user through a first meter of the oversubscription module and outputting a first output data flow from the first meter, where the first data flow is policed in relation to a first Committed Information Rate (CIR) and a first Peak Information Rate (PIR), wherein the first Committed Information Rate (CIR) is a guaranteed level of bandwidth allocated to the first data flow determined in relation to a first service agreement, and the first Peak Information Rate (PIR) is a maximum bandwidth allocated to the first data flow determined in relation to the first service agreement;

policing a second data flow from the second user through a second meter of the oversubscription module and outputting a second output data flow from the second meter, where the second data flow is policed in relation to a second Committed Information Rate (CIR) and a second Peak Information Rate (PIR), wherein the second Committed Information Rate (CIR) is a guaranteed level of bandwidth allocated to the second data flow determined in relation to a second service agreement, and the second Peak Information Rate (PIR) is a maximum bandwidth allocated to the second data flow determined in relation to a second service agreement; and policing an aggregated output data flow of the first output data flow from the first meter and the second output data flow from the second meter through a third meter of the oversubscription module, where the aggregated output data flow is policed in relation to a third Committed Information Rate (CIR) and a third Peak Information Rate (PIR), wherein the third Committed Information Rate (CIR) is greater than or equal to a summation of the first Committed Information Rate (CIR) and the second Committed Information Rate (CIR), and the third Peak Information Rate (PIR) is at least equal to a larger of the first Peak Information Rate (PIR) or the second Peak Information Rate (PIR) to ensure high priority transfer of data from the first user and the second user through the network.

2. The method of claim 1, wherein the network is a connection-less network.

3. The method of claim 2, wherein the connection-less network comprises an IP network.

4. The method of claim 1, wherein the network is a connection-oriented network.

5. The method of claim 4, wherein the connection-oriented network comprises an Asynchronous Transfer Mode (ATM) network.

6. The method of claim 1, wherein one or more of the first data flow and the second data flow comprises realtime voice data.

7. The method of claim 1, wherein one or more of the first data flow and the second data flow comprises realtime video data.

8. The method of claim 1, wherein each of the first meter, the second meter, and the third meter comprises a Two Rate Three Color Marker meter.

9. The method of claim 1, wherein each of the first meter, the second meter, and the third meter comprises a Single Rate Three Color Marker meter.

* * * * *